(No Model.) 2 Sheets—Sheet 1.

A. B. BEAN.
FRICTION CLUTCH.

No. 321,941. Patented July 14, 1885.

WITNESSES:
George L. Barnes.
John C. Gallagher.

INVENTOR
Albert B. Bean
BY
Julius Twiss
ATTORNEY (No Model.)  2 Sheets—Sheet 2.

A. B. BEAN.
FRICTION CLUTCH.

No. 321,941.  Patented July 14, 1885.

WITNESSES:
George L. Barnes.
John C. Gallagher.

INVENTOR
Albert B Bean
BY
Julius Thies
ATTORNEY

UNITED STATES PATENT OFFICE.

ALBERT B. BEAN, OF NEW HAVEN, CONNECTICUT.

FRICTION-CLUTCH.

SPECIFICATION forming part of Letters Patent No. 321,941, dated July 14, 1885.

Application filed June 11, 1885. (No model.)

*To all whom it may concern:*

Be it known that I, ALBERT B. BEAN, of the town and county of New Haven, and State of Connecticut, have invented a new and useful Improvement in Friction-Clutches, of which the following is a specification.

My invention relates to a band-clutch, and has for its object to provide a simple, elastic, and cheaply-constructed friction-band for clutching the friction disk or drum.

In ordinary band-clutches the shaping, securing, and fitting of a steel or wrought-iron band is expensive; and my improvement consists in casting the band integral with the clutch-pulley, as hereinafter more fully described and claimed.

By this construction the band is always secured in place, is easily bored and fitted when the pulley is in the turning-lathe, and may be made of cast-iron, which is a very elastic substance and well adapted for a frictional surface.

Figure 1:
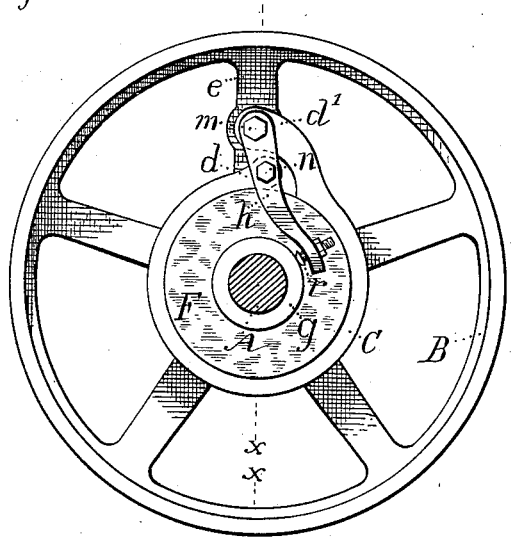
Figure 2:
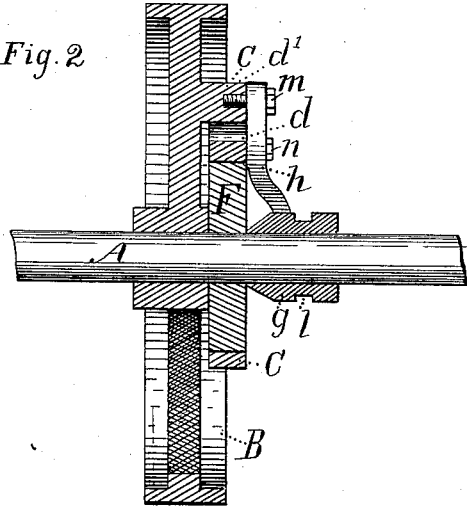
Figure 3:
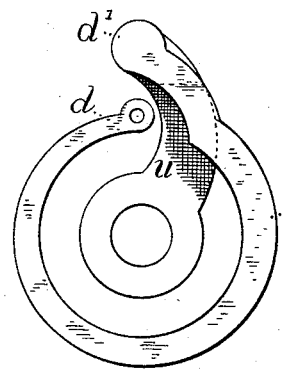
Figure 4:
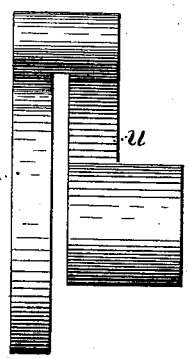

In the accompanying drawings, Figure 1 represents an end view of my improved clutch. Fig. 2 shows a longitudinal section on the line $x\ x$, Fig. 1, and Figs. 3 and 4 show modifications.

In the drawings, A denotes an ordinary shaft, upon which a loose pulley, B, is mounted. Arranged concentric with the pulley is a band or ring, C, which is not continuous, but is formed with ends $d\ d'$. One end of the ring is offset radially, so as to lap over the other end, and the offset end $d'$ is cast integral with an arm, $e$, of the pulley B. Fixed on the shaft A and contiguous to the pulley B is a friction-disk, F, which fits loosely within the band C. Adjacent to the disk and arranged to slide lengthwise on the shaft is a conical sleeve, $g$, around which a groove, $l$, is turned. The groove receives the forked end of an ordinary clutch-handle, (not shown,) which may be fulcrumed to any convenient stationary support. A lever, $h$, is fulcrumed at one end on a bolt, $m$, which is screwed into the fixed end $d'$ of the ring or band C, and the opposite or free end $d$ of the band is connected to the lever by a pivot-bolt, $n$, which is screwed into the ring. The lever $h$ extends to the center of the pulley, and has an adjustable stud, $r$, screwed through its opposite end. The stud bears upon the conical sleeve $g$, and is so adjusted that the lever $h$ will draw the band C tightly around the disk F when the largest part of the conical sleeve is thrust under the stud. Suitable collars may be arranged on the shaft to hold the pulley in position and limit the movement of the sleeve $g$.

Constructed as above described and shown, the operation of my improved clutch is as follows: When the band C is in its normal position, it is not in contact with the friction-disk F, and the pulley is free to revolve loose on the shaft. The stud $r$ is so adjusted that the band will be drawn tightly around the disk F as the conical sleeve $g$ is thrust under the lever $h$, and the disk and shaft will then revolve with the pulley driven by the friction of the band on the disk.

This clutch is effective and cheap in construction, as the band C is cast integral with the pulley, and the only work required to fit it is to bore it cylindrical while the pulley is in the turning-lathe. The band is thus in perfect alignment with the pulley and cannot change its position. The disk F is slightly smaller than the interior of the band, and the elasticity of cast-iron is sufficient to allow for a considerable wear of the frictional surfaces. In the construction of this pulley the ring or band C, when cast, is connected to each of the pulley-arms by a thin web or stay of iron, which is afterward cut off by the turning-tool when the band is bored. The webs or stays are formed near the inner surface of the band, where they may be easily reached by the boring-tool, and their purpose is to hold the band firmly while it is being bored. When the band is finished, there is no further use for the webs, and they are then cut away.

It is evident that the disk or drum and band may be arranged in converse relation from that described—that is to say, the disk F may be fixed on the pulley, and the band C may be cast integral with an arm secured on the shaft, as shown in Figs. 3 and 4.

In friction-hoists, the band may be cast integral with the winding-drum or with the gearing thereof.

In large clutches the band or ring may be made of steel and united with the pulley by being arranged with one end projecting into the mold, so that the molten iron will flow around and adhere to it when the pulley is cast.

It is evident that the frictional surface of the band C may be made V-shaped or of any other desired form. When the band is made V-shaped, the disk F may be fitted in the ring C by being made in suitable separate sections and bolted together.

I desire to secure by Letters Patent—

1. In a clutch, a friction band or ring, C, having one end cast integral with the pulley, and the other end secured to and actuated by a lever, and adapted to clutch a disk or drum fastened on the shaft, substantially as described.

2. The combination, with the friction-disk F, of the friction band or ring C, having one end cast integral with the clutch-pulley, the lever h, pivoted to the band, the adjusting-stud r in the end of the lever, and the cone g, all arranged and operated substantially in the manner and for the purpose specified.

3. In a clutch, a friction band or ring cast or formed integral with a pulley, arm, or other revolving part, and adapted to clasp and operate a friction disk or drum, substantially in the manner described.

4. In a clutch, the friction band or ring C, cast integral with an arm, u, secured to the pulley-shaft and adapted to clasp a friction-disk, in the manner specified.

ALBERT B. BEAN.

Witnesses:
J. W. POND,
PHILIP POND.